United States Patent [19]
Renard et al.

[11] 3,871,676
[45] Mar. 18, 1975

[54] PORTABLE LUGGAGE OR LOAD CARRIER

[76] Inventors: Charles J. Renard, 356 Vincent Pl.;
Louis L. Rifken, 344 Vincent Pl.,
both of Elgin, Ill. 60120

[22] Filed: Feb. 1, 1974

[21] Appl. No.: 438,871

[52] U.S. Cl. .............................. 280/35, 280/34 B
[51] Int. Cl. ........................................... B62d 21/14
[58] Field of Search ............ 280/36 R, 35, 47.13 R, 280/79.1, 34 R, 34 B

[56] References Cited
UNITED STATES PATENTS

| | | | |
|---|---|---|---|
| 442,825 | 12/1890 | Randall | 280/35 |
| 1,173,517 | 2/1916 | Hosick | 280/35 |
| 2,534,367 | 12/1950 | Perrotta | 280/35 |
| 2,629,607 | 2/1953 | Roubeck | 280/35 |
| 3,393,835 | 7/1968 | Kantor | 280/179 A |

*Primary Examiner*—Robert R. Song
*Attorney, Agent, or Firm*—Max R. Kraus

[57] ABSTRACT

A portable luggage or load carrier comprising a plurality of pivotally connected members, links or levers to form a generally lazy-tongs type of linkage, with said members or links having rollers or casters secured to the outer ends thereof whereby the load carrier may be moved on a ground or supporting surface, said pivotally connected members or links adapted to be pivoted to an extended load carrying position, said strap members connected to said load carrier whereby the load is supported on the load carrier and moved with the load carrier on the ground or supporting surface, said load carrier being readily pivotable to a collapsed position to occupy a minimum of space so that it may be easily carried in a non-load carrying position.

6 Claims, 10 Drawing Figures

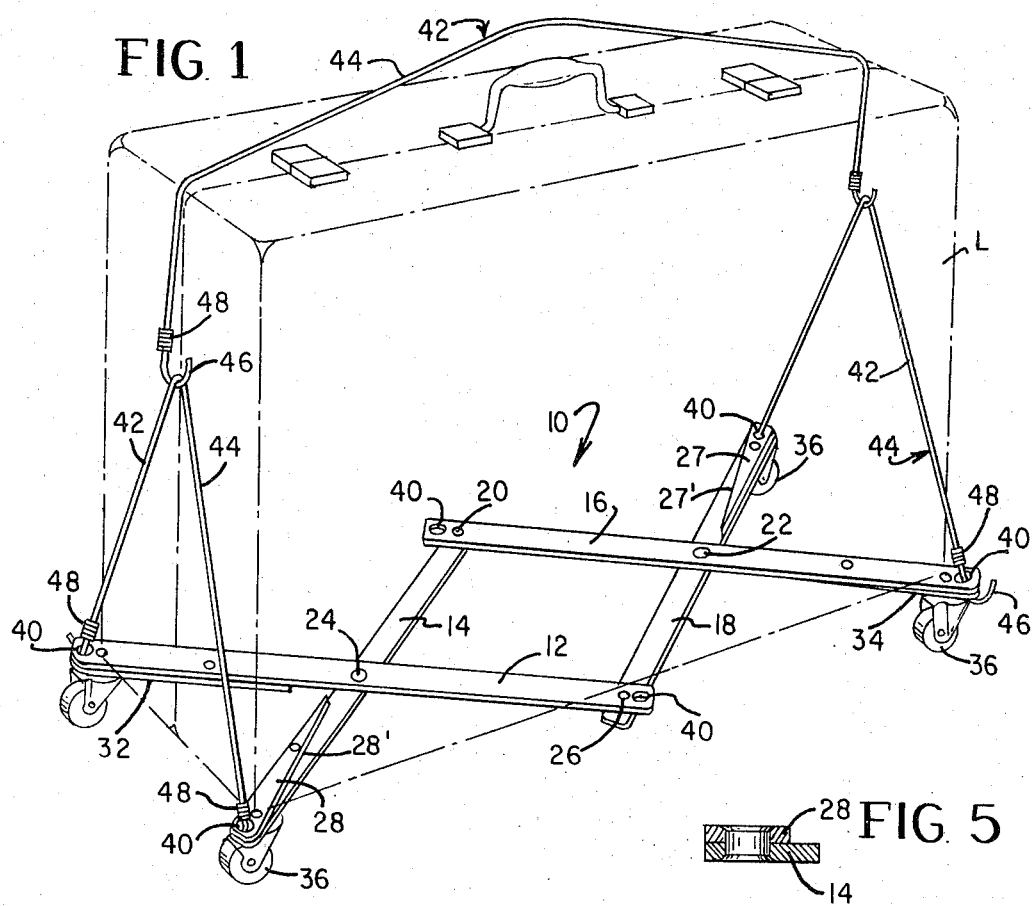
FIG. 1
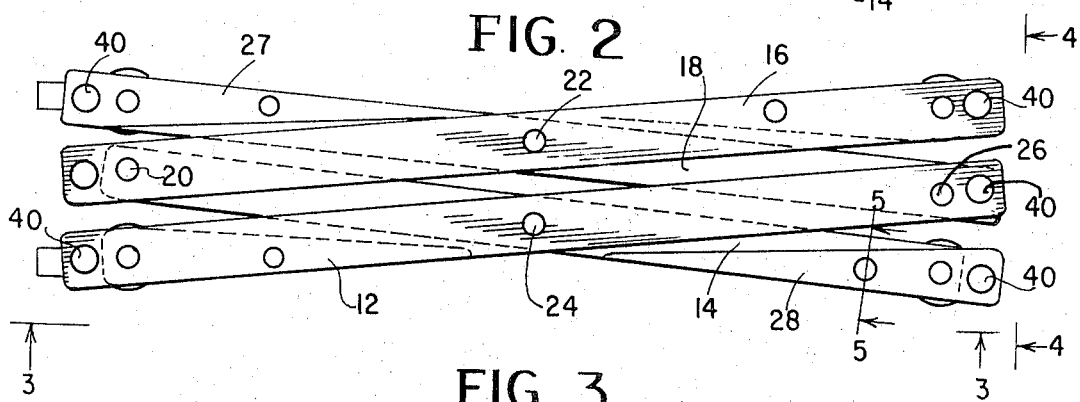
FIG. 2
FIG. 5
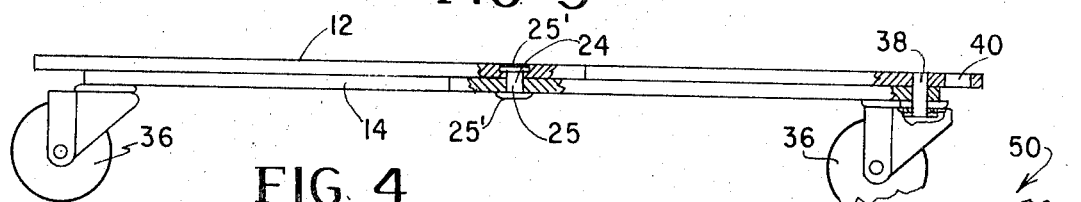
FIG. 3
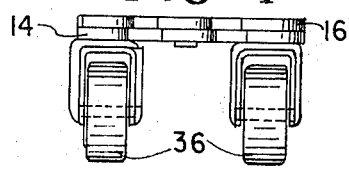
FIG. 4
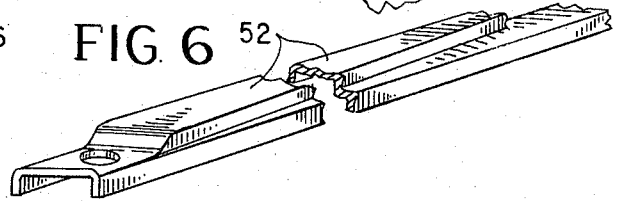
FIG. 6

PORTABLE LUGGAGE OR LOAD CARRIER

BRIEF SUMMARY OF THE INVENTION

Travelers have frequently found it necessary to carry their own luggage and because of the size and weight it is unwieldly and can present a physical problem which could result in strain or injury to the traveler. One of the objects of this invention therefore is to provide a very simple, portable and collapsible load carrying device having rollers or casters which can be readily collapsed to occupy a minimum of storage space when not in use and which may be carried and transported in such collapsed position, yet may be readily extended to in-use position whereby luggage or any load to be carried can be readily placed on the load carrier and rolled on a floor or ground surface.

Another object of this invention is to provide a load carrier having a plurality of pivotally interconnected members such as links or levers which form a lazy-tongs type of linkage so that when in extended position they may support one or more pieces of luggage or a box or a container, and where said pivotally interconnected members permit pivoting of said interconnected members to accommodate loads or luggage of varying widths and lengths.

Another object of this invention is to provide a load carrier which is relatively light in weight, may be economically produced, and which is readily attachable to and detachable from the load to be carried.

BRIEF DESCRIPTION OF THE DRAWINGS

In the drawings:

FIG. 1 is a perspective view of the load carrier of this invention in extended or load carrying position with a piece of luggage in phantom supported thereon and with the elastic cord members attached to the carrier and to the luggage to retain it on the load carrier.

FIG. 2 is a top plan view of the load carrier in its collapsed position.

FIG. 3 is a side elevational view taken on line 3—3 of FIG. 2.

FIG. 4 is an end elevational view of the luggage carrier when in collapsed position, taken on line 4—4 of FIG. 2.

FIG. 5 is a sectional view taken on line 5—5 of FIG. 2.

FIG. 6 is a view partly in section of a modified link or member.

FIGS. 1-5

Figure 7:
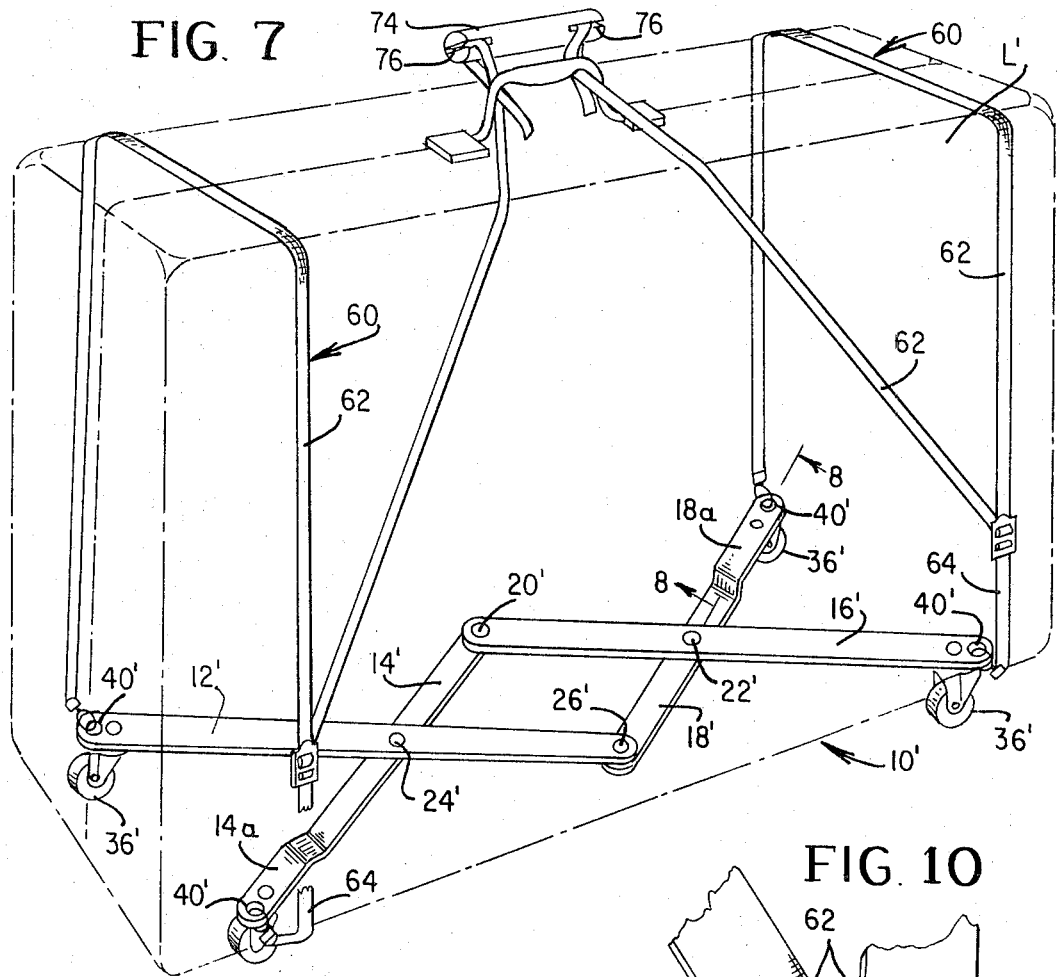
FIG. 7 is a perspective view similar to FIG. 1 of a modified load carrier.
Figure 8:
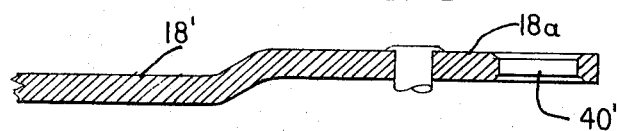
FIG. 8 is a sectional view taken on line 8—8 of FIG. 7.
Figure 9:
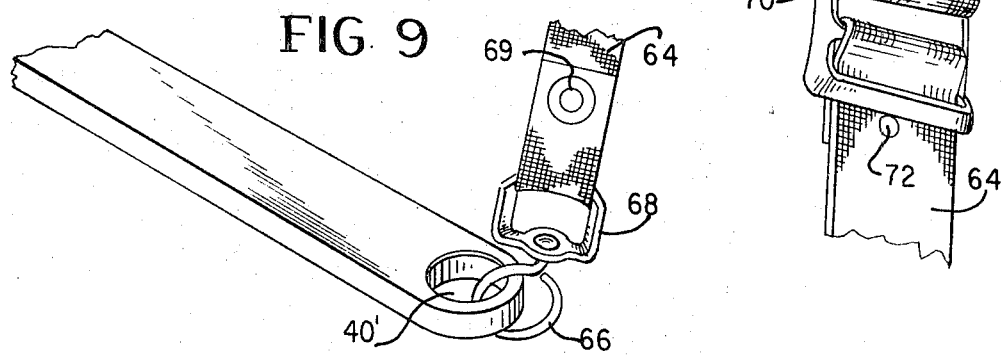
FIG. 9 is a view showing the means for swivelly connecting the ends of the strap to the ends of interconnected members.
Figure 10:
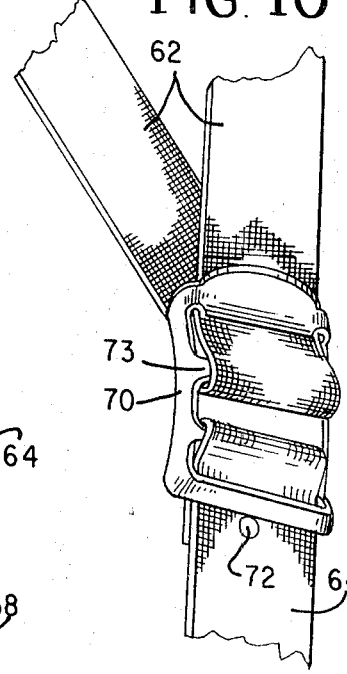
FIG. 10 is a view of the slide buckle permitting adjustment of the straps.

The load carrier shown in FIGS. 1 to 5 inclusive will be first described.

The load carrier generally indicated at 10 is formed of four interconnected members, links or levers generally indicated at 12, 14, 16 and 18, which are pivotally interconnected so as to form a lazy-tongs type of linkage and may be pivoted so that the interconnected links assume a load carrying position to support and carry a load, as shown in FIG. 1, or to a collapsed, non-load carrying position as shown in FIG. 2, in which position the load carrier occupies a minimum of space and may be thus readily transported and carried making it readily available for use. The four interconnected members 12, 14, 16 and 18 may be made preferably of a metal which is light in weight but which has structural strength and they are each of a generally elongated rectangular shape.

Member or link 16 is pivotally connected at one end to the end of member 14 by a pivotal connection indicated at 20 and member 16 is pivotally connected intermediate its ends to member 18 intermediate the ends of member 18 by a pivotal connection 22. Member 14 is pivotally connected intermediate its ends to the intermediate portion of member 12 by a pivotal connection 24. Member 18 is pivotally connected to member 12 by pivotal connection 26. This arrangement forms a lazy-tongs type of linkage. Each of the pivotal connections is similar to the pivotal connection 24 shown in FIG. 3 which comprises a pin or stud 25 extending through alined openings in each of the members with the opposite ends of the stud flattened to form heads 25' for securing the stud in pivotal position.

In view of the fact that the members or links 14 and 18 are below the plane of the top of links 12 and 16, the links 14 and 18 are each fixedly provided with a strip secured to the top thereof adjacent the outer ends which compensates for the different thickness. Member or link 18 has a strip 27 fixedly secured to the top thereof. Member or link 14 has a strip 28 fixedly secured to the top thereof. Strips 27 and 28 are of generally similar shape with the inner facing side edges of each designated at 27' and 28' being inclined to permit collapsing of the load carrier. With the strips 27 and 28 on the members 18 and 14 it will be seen that the tops of said members at the points on which the luggage rests are on the same horizontal plane as the tops of members 12 and 16 so that the bottom of the luggage or load which is carried rests on a flat surface.

Fixedly secured to the undersurface of member 12 is a strip 32 and fixedly secured to the undersurface of member 16 is a strip 34. Both strips 32 and 34 are of the same configuration as strips 27 and 28. The undersurface strips 32 and 34 are principally for the purpose of providing thickened wall surfaces adjacent the outer ends of the respective members to which they are affixed for accommodating the pins of the rollers or casters to be described.

Conventional rollers or swivel casters, all generally indicated at 36 are secured and connected to the outer ends of members or links 12, 14, 16 and 18. Each of said conventional rollers or swivel casters has a conventional upwardly extending stud or pin 38, best seen in FIG. 3, which is fixedly inserted into an opening in the outer end of said member or link to permanently attach the rollers or casters to said links or members. Said conventional rollers or casters are therefore permitted to rotate 360° relative to the horizontal plane of the links or members and the wheels or casters are likewise rotatable 360° and they support the load carrier on a ground or floor surface.

The outer ends of each of said members or links 12, 14, 16 and 18 are each provided with an opening, all generally indicated at 40, for the purpose of permitting attachment of the straps or connectors so that the luggage or load supported on the load carrier may be securely held while being transported on the load carrier. One manner of securing a conventional piece of luggage or bag L on the load carrier 10 is illustrated in FIG. 1. Straps or connectors all generally indicated at 42 may be used. The straps or connectors 42 may comprise an elastic cord-like member 44 to the opposite ends of each is secured a hook-like member 46 which may be secured to the opposite ends of the cords and connected thereby by a coil spring 48 which may be part of the hook-like member 46. The hooks 46 of the straps or connectors are inserted in the openings 40 of the members or links to anchor the straps thereto. For example, one strap 42 is secured to one end of the luggage carrier with another similar strap secured to the other end and a third strap is positioned across the top of the luggage case with the hooks attached to the straps intermediate the ends thereof, as shown in FIG. 1. The strap arrangement may be varied and other straps may be secured to the openings 40 of the links or members 12 and 16 for additional securement of the luggage to the carrier.

FIG. 2 shows the load carrier 10 in a collapsed position— to which position it is collapsed when it is to be carried and it is most portable when in its non-use position. As will be seen, the members or links are pivoted so that they are adjacent each other to occupy a minimum of space, yet they may be readily pivotally expanded to the extended position shown in FIG. 1, or to various intermediate positions, or even extended in a more elongated manner than what is shown in FIG. 1 if necessary by virtue of the length of the piece of luggage. When in collapsed position the inclined edges 27' and 28' of the respective strips 27 and 28 will abut the sides of adjacent members or links so that there will be no interference in moving the links to collapsed position.

FIG. 6

FIG. 6 shows a modified member or link generally indicated at 50 which may be used in lieu of the members or links heretofore described. The member or link 50 shown in FIG. 6 is a generally channel-shaped metal member which has an upwardly extending offset portion 52 which offset portion is shaped similar to the strips 27 and 28. Said offset portion is integrally formed with said member 50 to avoid the need for positioning a strip like 27 or 28 on links like 14 and 18. The other two links, for example 12 and 16, may be made without the offset. In all other respects the members or linkage shown in FIG. 6 is similar to that previously described and said members 50 are interconnected to form the lazy-tongs arrangement.

While only four members or links are shown connected to form the lazy-tongs linkage, it will be understood that any number of additional members or links may be added to the linkage and connected similarly to those previously described if it is desired that the load carrier be longer than that herein shown.

FIGS. 7–10

The load carrier illustrated in FIGS. 7–10 inclusive is substantially like that illustrated in FIGS. 1 through 5, except that two of the interconnected members, links or levers are formed or preshaped with an offset portion adjacent their outer ends and that adjustable straps are permanently connected to the load carrier so that tightening the straps about the load or luggage simultaneously pivots the interconnected members or links to their proper position lengthwise and widthwise with respect to the load to securely fasten and support the load or luggage on the carrier. The interconnected members and their pivotal connections will be designated by the same numerals previously used, except that they will be primed.

The modified load carrier is generally indicated at 10' and is formed of four interconnected members, links or levers generally indicated at 12', 14', 16' and 18', all of which are of substantially equal length and which are pivotally interconnected so as to form a lazy-tongs type of linkage and may be pivoted so that the interconnected links assume a load carrying position to support and carry a load, as shown in FIG. 7, or to a collapsed, non-load carrying position substantially as shown in FIG. 2, in which position the load carrier occupies a minimum of space and may be thus readily transported and carried making it readily available for use. The four interconnected members 12', 14', 16' and 18' may be made preferably of a metal which is light in weight but which has structural strength and they are each of a generally elongated rectangular shape.

Member or link 16' is pivotally connected at one end to the end of member 14' by a pivotal connection indicated at 20' and member 16' is pivotally connected intermediate its ends to member 18' intermediate the ends of member 18' by a pivotal connection 22'. Member 14' is pivotally connected intermediate its ends to the intermediate portion of member 12' by a pivotal connection 24'. Member 18' is pivotally connected to member 12' by pivotal connection 26'. This arrangement forms a lazy-tongs type of linkage. Each of the pivotal connections is similar to the pivotal connection 24 shown in FIG. 3 and previously described.

In the load carrier shown in FIGS. 1–5 the pivotal connections 22 and 24 intermediate the ends is substantially centrally of the length of the members, whereas in the FIGS. 7–10 modification the pivotal connections 22' and 24' intermediate the ends are not centrally but spaced from the center. For example, the pivotal connection of 22' is closer to the ends of pivotal connections 20' and 26' than it is to the opposite ends of link members 16' and 18', and likewise the pivotal connection 24' is closer to the ends of pivotal connections 26' and 20' than it is to the opposite ends of links 12' and 16'. Thus when the linkage is in extended position, as shown in FIG. 7, the ends of the links at pivotal connections 20' and 26' are inwardly of the outer ends of links 12', 14', 16' and 18'.

In view of the fact that the members or links 14' and 18' are below the plane of the top of links 12' and 16', the links 14' and 18' are each preshaped to provide an upwardly extending offset portion adjacent the outer ends of each of said links which compensates for the differences. Member or link 18' has an offset portion 18a. Member or link 14' has an offset portion 14a. The offset portions 18a and 14a are integral parts of their respective links but the tops thereof are on the same horizontal plane as the tops of links 12' and 16' so that the luggage or load rests flat on the same horizontal plane throughout the area of the load carrier on which it is carried.

Conventional rollers or swivel casters, all generally indicated at 36' are secured and connected to the outer ends of members or links 12', 14', 16' and 18'. Each of said conventional rollers or swivel casters has a conventional upwardly extending stud or pin which is similar to that previously described and which is fixedly inserted into an opening in the outer end of said member or link to permanently attach the rollers or casters to said links or members. Said conventional rollers or casters are therefore permitted to rotate 360° relative to the horizontal plane of the links or members and the wheels or casters are likewise rotatable 360° and they support the load carrier on a ground or floor surface.

The outer ends of each of said members or links 12', 14', 16' and 18' are each provided with an opening, all generally indicated at 40', for the purpose of permitting permanent attachment of the straps or connectors so that the luggage or load supported on the load carrier may be securely held while being transported on the load carrier. One manner of securing a conventional piece of luggage or bag L' on the load carrier 10' is illustrated in FIG. 7, and the straps or connectors indicated at 60 may be used.

One adjustable strap 60 is permanently connected to the ends of links or members 12' and 14' and extends therebetween, and a similar adjustable strap is permanently connected to the ends of links or members 16' and 18' and extends therebetween. Each strap 60 comprises two portions designated at 62 and 64. Portion 62 is the longer strap portion and is permanently attached at one end by means of a conventional ring 66 and swivel bracket 68 to the opening 40' on member 12', with said end of the strap looped around and fastened to itself by a fastening member 69, which permits the strap to swivel. The other and shorter strap portion 64 is permanently and swivelly attached in a similar manner to opening 40' on the end of link or member 14'.

A conventional slide buckle generally indicated at 70 is permanently secured as at 72 to the opposite end of the short strap portion 64. The unattached or free end of the longer strap portion 62 passes through the slide buckle 70 and around and across the conventional cross bar 73 thereof, as is well understood, and best shown in FIG. 10. By pulling on the free end of the long strap portion 62 slides through the buckle 70 to shorten the length of the long strap portion 62 extending around the load or luggage L', as shown in FIG. 7, and this tends to pivot the links 12' and 14' toward each other, with a like movement taking place at the opposite end, namely, at links or members 16' and 18'. The straps 62 at the opposite ends are similarly tightened. To loosen or lengthen the long strap portion 62 for releasing it from around the load, the strap portion 62 is slid in the opposite direction and it slides in the slide buckle 70. The long strap portion 62 is therefore adjustable to accommodate different sizes and dimensions of luggage or loads positioned on the load carrier and holds the load or luggage securely to the load carrier so that same may be pushed or moved on a floor or ground surface.

As is clear, when the links 12' and 14' pivot toward each other the other links 16' and 18' similarly pivot toward each other which elongates the load carrier and reduces the width thereof, and conversely when the links pivot in a direction away from each other the load carrier is shortened and simultaneously widened. By loosening or tightening the straps around the load or luggage the foregoing adjustment of the load carrier relative to the load takes place automatically, with the slide buckle 70 holding the strap 62 in any of its adjusted positions.

The free ends of the portions of the longer straps 62 may if desired be attached to a handle 74 having slots 76 at its opposite ends which receive the ends of the opposite straps and permits the load carrier to be moved about by engagement with the handle 74.

While the invention is shown herein as carrying a single piece of luggage, it is not so limited in usage as other pieces of luggage can be positioned on each side and strapped to the central piece of luggage.

What is claimed is:

1. A portable luggage carrier comprising at least four interconnected links pivotally connected, with each link pivotally connected to another link intermediate the opposite ends and also pivotally connected to another link adjacent their ends so that said interconnected links form a lazy-tongs type of linkage arrangement whereby said links may be pivoted to an extended elongated luggage carrying position or to a retracted no-luggage carrying position where the links are pivoted to lie adjacent and substantially contiguous to each other, a roller or caster secured to the outer ends of each of said links whereby the luggage carrier may be rolled or wheeled on a floor or ground surface with the luggage supported thereon, said links having means associated therewith whereby the top portions of the links are on the same horizontal plane so that the bottom of the luggage rests flat on the interconnected links, the outermost ends of each of said links having means to which straps are secured, which straps are secured to the luggage to retain the luggage on said luggage carrier while the carrier is rolled on a floor or ground surface.

2. A portable luggage carrier as set forth in claim 1 in which the straps are adjustable with respect to the luggage carrier, and by said adjustment of said straps the links are caused to pivot relative to each other to lengthen or shorten the load carrier.

3. A portable luggage carrier as set forth in claim 1 in which the strap extends between and is connected to a pair of pivoted links which, when the strap is adjustably tightened around the luggage, will cause said links to pivot toward each other to automatically lengthen or elongate the load carrier.

4. A portable luggage carrier as set forth in claim 1 in which the straps are flexible and elastic and in which they are detachably secured to the carrier.

5. A portable luggage carrier as set forth in claim 1 in which two of said links have upwardly extending offset portions extending to the same horizontal plane of the top surfaces of said two other links so that the top surfaces of all four members are on the same horizontal plane.

6. A portable luggage carrier as set forth in claim 1 in which the links have openings adjacent their ends and in which the straps have hook ends which are secured to said openings to hold the luggage in a secure position.

* * * * *